(12) United States Patent
Shibayama et al.

(10) Patent No.: US 7,437,283 B2
(45) Date of Patent: Oct. 14, 2008

(54) SYSTEM FOR EVALUATING TARGET BOARD BY USING EVALUATION MICROCOMPUTER IN WHICH STORAGE OF ENVIRONMENT DATA ARE POWERED BY EVALUATION TOOL

(75) Inventors: Yuichi Shibayama, Kawasaki (JP); Yoshiyuki Kubo, Kawasaki (JP); Norihiro Nakatsuhama, Kawasaki (JP); Naoya Watanabe, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 565 days.

(21) Appl. No.: 10/105,156

(22) Filed: Mar. 26, 2002

(65) Prior Publication Data
US 2003/0074180 A1   Apr. 17, 2003

(30) Foreign Application Priority Data
Oct. 12, 2001   (JP) .............................. 2001-315023

(51) Int. Cl.
*G06F 9/455* (2006.01)
(52) U.S. Cl. .......................................... 703/28; 714/28
(58) Field of Classification Search .................... 703/25, 703/28; 702/117; 714/28, 29, 30
See application file for complete search history.

(56) References Cited

U.S. PATENT DOCUMENTS

| | | | |
|---|---|---|---|
| 5,579,201 A * | 11/1996 | Karageozian | 361/119 |
| 5,721,879 A | 2/1998 | Harada et al. | |
| 6,339,753 B1 * | 1/2002 | Nagatome | 703/28 |
| 6,922,794 B2 * | 7/2005 | Tagawa et al. | 714/28 |
| 2002/0052729 A1 * | 5/2002 | Kyung et al. | 703/28 |

FOREIGN PATENT DOCUMENTS

| | | |
|---|---|---|
| JP | 08-137823 | 5/1996 |
| JP | 11-102305 | 4/1999 |

OTHER PUBLICATIONS

ATMEL; AT90ICEPRO User Guide; Jan. 1999; ATMEL; all pages.*
Anonymous, "A Road Map for the Legend of Zelda Cartridge", 1998, retrieved from http://hem.passagen.se/flubba/download/zelda_roadmap.html on Nov. 1, 2006.*
Japanese Abstract No. 11-282710, dated Oct. 15, 1999.
Japanese Abstract No. 04278645 A, dated Oct. 5, 1992.
Office Action in corresponding JP Patent Application No. 2001-315023, mailed Feb. 28, 2006.
Japanese Office Action issued Jan. 23, 2007 in prior Japanese application 2001-315023.

* cited by examiner

*Primary Examiner*—Zoila E. Cabrera
*Assistant Examiner*—Jason Proctor
(74) *Attorney, Agent, or Firm*—Staas & Halsey LLP

(57) ABSTRACT

In an evaluation system for evaluating a target board produced for use with a microprocessor, an evaluation microcomputer is connected between the target board and an evaluation tool. In the evaluation microcomputer: an emulation circuit emulates functions of the microprocessor, and supplies an emulation result to the evaluation tool through an interface circuit; the interface circuit interfaces the emulation circuit with the evaluation tool; and a data storing circuit stores data relating to the microprocessor. The emulation circuit and the interface circuit are powered by the target board, and the data storing circuit is powered by the evaluation tool. Alternatively, when the interface circuit further has the function of the data storing circuit, the interface circuit is powered by the evaluation tool.

12 Claims, 8 Drawing Sheets

SYSTEM FOR EVALUATING TARGET BOARD BY USING EVALUATION MICROCOMPUTER IN WHICH STORAGE OF ENVIRONMENT DATA ARE POWERED BY EVALUATION TOOL

BACKGROUND OF THE INVENTION

1) Field of the Invention

The present invention relates to an evaluation system for evaluating a target board which is produced for use with a microprocessor. The present invention also relates to an evaluation microcomputer as a constituent of an evaluation system for evaluating a target board which is produced for use with a microprocessor.

2) Description of the Related Art

In order to develop a system including a microprocessor, it is necessary to check whether or not the microprocessor matches with peripheral devices and the like, and whether or not firmware normally operates, where the firmware is stored in, for example, a ROM (Read Only Memory). Further, in order to make the above checks, it is necessary to monitor the internal state of the microprocessor and stop the operation of the microprocessor at an arbitrary location in the firmware. Therefore, conventionally, an evaluation device which can emulate the functions of the microprocessor and monitor the internal state of the microprocessor is produced, and connected to a board (hereinafter called a target board) on which a system required to be developed is mounted. Then, the above checks are made by sending instructions from a personal computer or the like to the evaluation device.

FIG. 8 is a diagram illustrating an example of a construction of an evaluation system for testing the microprocessor. The evaluation system of FIG. 8 comprises a target board 10, an evaluation microcomputer 12, an evaluation tool 14, and a personal computer 16.

The target board 10 is a printed circuit board on which a system to be developed is mounted. Specifically, a socket 10a into which a microprocessor is to be inserted, semiconductor devices, electronics parts, and the like are arranged on the target board 10.

The evaluation microcomputer 12 has the same functions as the microprocessor which is to be inserted into the socket 10a, and a function of monitoring a microprocessor. The evaluation microcomputer 12 is connected to the socket 10a through a cable 11 so that data can be exchanged between the target board 10 and the evaluation microcomputer 12. In addition, the evaluation microcomputer 12 is connected to the evaluation tool 14 through a cable 13. The evaluation microcomputer 12 receives and processes ROM data (firmware data to be stored in the ROM) and control signals from the evaluation tool 14, and sends to the evaluation tool 14 data obtained by the processing of the ROM data and the control signals.

The evaluation tool 14 generates the ROM data based on data supplied from the personal computer 16, and supplies the ROM data to the evaluation microcomputer 12. In addition, the evaluation tool 14 generates the control signals for controlling the evaluation microcomputer 12, and supplies the control signals to the evaluation microcomputer 12. Further, the evaluation tool 14 receives the data supplied from the evaluation microcomputer 12, and supplies the data to the personal computer 16.

The personal computer 16 supplies the ROM data and control signals for controlling the evaluation microcomputer 12, to the evaluation tool 14 through a cable 15. In addition, the personal computer 16 acquires and analyzes data collected by the evaluation microcomputer 12.

The operations of the conventional evaluation system of FIG. 8 are explained below.

A user manipulates the personal computer 16 so as to supply control signals to the evaluation microcomputer 12, change the operation mode of the microprocessor from an emulation mode to a debug mode, and adjust the setting to the environment of the target board 10. Specifically, the ROM area in the address space, a mask area of the ROM (i.e., an area of the ROM which cannot be used), and the like are set.

The emulation mode is a normal operation mode in which the evaluation microcomputer 12 supplies the ROM data to the microprocessor so that the microprocessor operates. The debug mode is an operation mode in which the internal state of the evaluation microcomputer 12 is set.

Next, the user manipulates the personal computer 16 so that the ROM data, which is to be debugged, is sent from the personal computer 16 to the evaluation tool 14, and is then supplied to the evaluation microcomputer 12. In the evaluation microcomputer 12, the microprocessor executes various types of processing and controls the respective portions of the target board 10, based on the ROM data supplied from the evaluation tool 14. At this time, the evaluation tool 14 monitors the internal state of microprocessor in the evaluation microcomputer 12, and supplies information on the internal state of microprocessor to the personal computer 16.

The personal computer 16 acquires the information on the internal state of microprocessor, which is supplied from the evaluation tool 14, at a predetermined timing (e.g., a timing of execution of a predetermined instruction), and displays the information in association with the ROM data. Thus, the user can make a judgement as to whether or not the ROM data is normally executed. When the ROM data is not normally executed, debugging can be performed by changing the ROM data.

Recently, microprocessors are mounted in mobile telephones and home electronics products, and it is necessary to check the operations of the microprocessors in the mobile telephones and home electronics products. However, often, the mobile telephones and home electronics products are suddenly powered off, and are thereafter powered again. It is necessary to check that the system normally operates even when the system is suddenly powered off, and is thereafter powered again.

Nevertheless, in the conventional evaluation systems, the power of the evaluation microcomputer 12 is supplied from the target board 10. Therefore, when the system is suddenly powered off, and is thereafter powered again, the data set in the evaluation microcomputer 12 is lost. Thus, when the system is powered again after the sudden power off, it is necessary to change the operation mode to the debug mode, set the data in the evaluation microcomputer 12 again, and return the operation mode to the emulation mode. Consequently, it takes excessive time to restart the system, and the operation on the restart cannot be monitored accurately.

SUMMARY OF THE INVENTION

An object of the present invention is to provide an evaluation system which can evaluate a target board produced for use with a microprocessor, and accurately emulate an operation of the target board on restart of the microprocessor.

Another object of the present invention is to provide an evaluation microprocessor which enables accurate emulation of an operation of a target board produced for use with a microprocessor, on restart of the microprocessor in a system for evaluating the target board.

(I) According to the first aspect of the present invention, there is provided an evaluation system which comprises an evaluation microcomputer and an evaluation tool, and evaluates a target board. The target board is produced for use with a microprocessor, and supplies first electric power to a first power supply circuit. The evaluation microcomputer is connected to the target board and the evaluation tool, and includes: an emulation circuit which emulates functions of the microprocessor, and supplies an emulation result to the evaluation tool through an interface circuit; the interface circuit which interfaces the emulation circuit with the evaluation tool, and stores data relating to the microprocessor; the first power supply circuit which receives the first electric power from the target board, and supplies the first electric power to the emulation circuit; and a second power supply circuit which receives second electric power from the evaluation tool, and supplies the second electric power to the interface circuit. The evaluation tool supplies the second electric power to the second power supply circuit, and receives the emulation result.

In the evaluation system according to the first aspect of the present invention, even when the power supply to the target board is stopped, the data stored in the interface circuit is maintained. Therefore, on restart, the emulation can be performed without resetting of the data in the interface circuit. That is, on restart, the emulation can be performed under a similar condition to a practical condition under which production-run chips operate, and the operation on restart can be accurately emulated.

The evaluation system according to the first aspect of the present invention may also have one or a combination of the following additional features (i) and (ii).
  (i) The evaluation microcomputer may further comprise a level converter arranged between the emulation circuit and the interface circuit.
  (ii) The evaluation microcomputer may further comprise a peripheral circuit to the microprocessor, and the first power supply circuit also supplies the first electric power to the peripheral circuit.

(II) According to the second aspect of the present invention, there is provided an evaluation microcomputer for emulating functions of a microprocessor which is to be mounted to a target board under evaluation. The evaluation microcomputer comprises: an emulation circuit which emulates the functions of the microprocessor, and outputs an emulation result through an interface circuit; the interface circuit which has a function as an interface between the emulation circuit and an evaluation tool, and stores data relating to the microprocessor; the first power supply circuit which receives first electric power from the target board, and supplies the first electric power to the emulation circuit; and a second power supply circuit which receives second electric power from the evaluation tool, and supplies the second electric power to the interface circuit.

The evaluation system according to the first aspect of the present invention can be realized by using the evaluation microcomputer according to the second aspect of the present invention.

The evaluation microcomputer according to the second aspect of the present invention may also have one or a combination of the following additional features (iii) and (iv).
  (iii) The evaluation microcomputer according to the second aspect of the present invention may further comprise a level converter arranged between the emulation circuit and the interface circuit.
  (iv) The evaluation microcomputer according to the second aspect of the present invention may further comprise a peripheral circuit to the microprocessor, wherein the first power supply circuit also supplies the first electric power to the peripheral circuit.

(III) According to the third aspect of the present invention, there is provided an evaluation system which comprises an evaluation microcomputer and an evaluation tool, and evaluates a target board. The target board is produced for use with a microprocessor, and supplies first electric power to a first power supply circuit. The evaluation microcomputer is connected to the target board and an evaluation tool, and includes: an emulation circuit which emulates functions of the microprocessor, and supplies an emulation result to the evaluation tool through an interface circuit; the interface circuit which interfaces the emulation circuit with the evaluation tool; a data storing circuit which stores data relating to the microprocessor; the first power supply circuit which receives the first electric power from the target board, and supplies the first electric power to the emulation circuit and the interface circuit; and a second power supply circuit which receives second electric power from the evaluation tool, and supplies the second electric power to the data storing circuit. The evaluation tool supplies the second electric power to the second power supply circuit, and receives the emulation result.

In the evaluation system according to the third aspect of the present invention, even when the power supply to the target board is stopped, the data stored in the data storing circuit is maintained. Therefore, on restart, the emulation can be performed without resetting of the data in the data storing circuit. That is, on restart, the emulation can be performed under a similar condition to the practical condition under which the production-run chips operate, and the operation on restart can be accurately emulated. In addition, the size of the circuitry of the evaluation microcomputer in the third aspect of the present invention can be reduced in comparison with the evaluation microcomputer in the first aspect of the present invention.

The evaluation system according to the third aspect of the present invention may also have one or a combination of the following additional features (v) and (vi).
  (v) The evaluation microcomputer may further comprise a first level converter arranged between the interface circuit and the data storing circuit, and a second level converter arranged between the interface circuit and the evaluation tool.
  (vi) The evaluation microcomputer may further comprise a peripheral circuit to the microprocessor, and the first power supply circuit also supplies the first electric power to the peripheral circuit.

(IV) According to the fourth aspect of the present invention, there is provided an evaluation microcomputer for emulating functions of a microprocessor which is to be mounted to a target board under evaluation. The evaluation microcomputer comprises: an emulation circuit which emulates the functions of the microprocessor, and outputs an emulation result through an interface circuit; the interface circuit which has a function as an interface between the emulation circuit and an evaluation tool; a data storing circuit which stores data relating to the microprocessor; the first power supply circuit which receives first electric power from the target board, and supplies the first electric power to the emulation circuit and the interface circuit; and a second power supply circuit which receives second electric power from the evaluation tool, and supplies the second electric power to the data storing circuit.

The evaluation system according to the third aspect of the present invention can be realized by using the evaluation microcomputer according to the fourth aspect of the present invention. In addition, the size of the circuitry of the evaluation microcomputer according to the fourth aspect of the present invention can be reduced in comparison with the evaluation microcomputer according to the second aspect of the present invention.

The evaluation microcomputer according to the fourth aspect of the present invention may also have one or a combination of the following additional features (vii) and (viii).

(vii) The evaluation microcomputer according to the fourth aspect of the present invention may further comprise a first level converter arranged between the interface circuit and the data storing circuit, and a second level converter arranged on an external side of the interface circuit.

(viii) The evaluation microcomputer according to the fourth aspect of the present invention may further comprise a peripheral circuit to the microprocessor, wherein the first power supply circuit also supplies the first electric power to the peripheral circuit.

(V) The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Embodiments of the present invention are explained below with reference to drawings.

(I) Basic Construction

Figure 1:
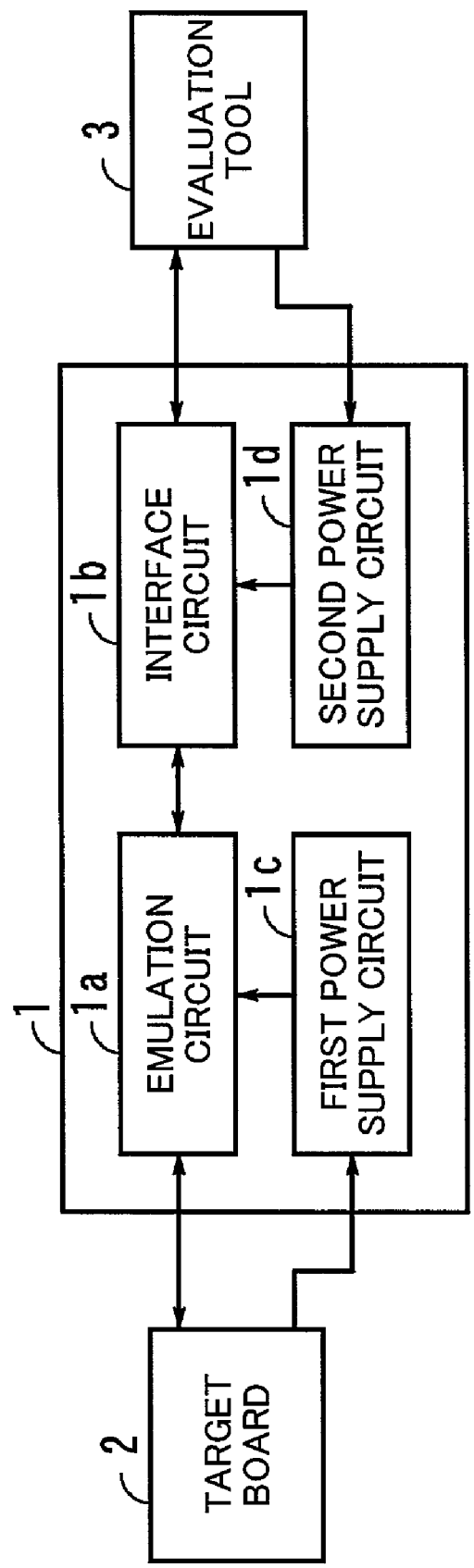
FIG. 1 is a diagram illustrating a basic construction of an evaluation system according to the present invention.

FIG. 1 is a diagram illustrating the basic construction of the evaluation system according to the present invention. The evaluation system 1 of FIG. 1 comprises an evaluation microcomputer 1, a target board 2, and an evaluation tool 3.

The evaluation microcomputer 1 comprises an emulation circuit 1a, an interface circuit 1b, a first power supply circuit 1c, and a second power supply circuit 1d. The evaluation microcomputer 1 emulates the function of a microprocessor to be mounted on the target board 2, and supplies the result of the emulation to the evaluation tool 3.

The target board 2 is a circuit board which is to be emulated. The target board 2 has a socket in which the microprocessor is to be mounted, and which is connected to the evaluation microcomputer 1 through a cable.

The evaluation tool 3 supplies to the evaluation microcomputer 1 control signals for controlling the evaluation microcomputer 1 and ROM data which is to be debugged. In addition, the evaluation tool 3 acquires the result of the emulation, and supplies to, for example, a personal computer (not shown in FIG. 1) so as to display the result of the emulation.

The emulation circuit 1a in the evaluation microcomputer 1 emulates the function of the microprocessor which is to be mounted on the target board 2. The interface circuit 1b functions as an interface used for exchanging data between the emulation circuit 1a and the evaluation tool 3, and stores predetermined data related to the microprocessor. The first power supply circuit 1c receives first electric power from the target board 2, and supplies the first electric power to the emulation circuit 1a. The second power supply circuit 1d receives second electric power from the evaluation tool 3, and supplies the second electric power to the interface circuit 1b.

The operations of the evaluation system of FIG. 1 are explained below.

(1) Operation for Environment Setting of Evaluation microcomputer 1

When the target board 2 and the evaluation tool 3 are powered, the first power supply circuit 1c supplies to the emulation circuit 1a the first electric power supplied from the target board 2, and the second power supply circuit 1d supplies to the interface circuit 1b the second electric power supplied from the evaluation tool 3. Thus, the emulation circuit 1a and the interface circuit 1b become capable of operation, and then a reset sequence is executed.

In the reset sequence, the target board 2 indicates a start address, i.e., an address of a portion of the ROM data which is to be first executed by the emulation circuit 1a.

When the reset sequence is completed, the emulation circuit 1a sends to the evaluation tool 3 a request for readout of the ROM data from the start address. In response to the request, the evaluation tool 3 reads out a tool program (i.e., a program for environment setting), and supplies the tool program to the evaluation microcomputer 1. Then, the emulation circuit 1a makes the environment setting of the evaluation microcomputer 1 in accordance with the supplied tool program, for example, by setting registers and the like in the interface circuit 1b, so that the environment setting corresponds to the target board 2.

(2) Operation for Executing User Program

When the environment setting is completed, the evaluation tool 3 sends control signals to the evaluation microcomputer 1 so that another reset sequence is executed. Thus, the target board 2 indicates a start address, i.e., an address of a portion of the ROM data which is to be first executed by the emulation circuit 1a.

When the reset sequence is completed, the emulation circuit 1a sends to the evaluation tool 3 a request for readout of the ROM data from the start address. In response to the request, the evaluation tool 3 reads out a user program (i.e., a program to be debugged), and supplies the user program to the evaluation microcomputer 1. Then, the emulation circuit 1a executes various types of processing and controls the respective portions of the target board 2, in accordance with the user program.

At this time, the evaluation tool 3 can set an appropriate break point in the user program so that the execution of the user program stops at an arbitrary location in the program. Therefore, the user program can be debugged by monitoring the states of the internal registers of the emulation circuit 1a when the execution of the program is stopped.

(3) Operation in Case of Power Off

When the electric power supplied to the target board 2 is turned off during execution of the user program, the first electric power supplied from the first power supply circuit 1c to the emulation circuit 1a also stops. Therefore, the operation of the emulation circuit 1a stops. At this time, the power supply to the evaluation tool 3 is maintained. Thus, the interface circuit 1b is powered by the second power supply circuit 1d, and the interface circuit 1b remains in operation.

(4) Operation on Restart

When the electric power supplied to the target board 2 is turned on again, the supply of the first electric power from the first power supply circuit 1c to the emulation circuit 1a is restarted, and the emulation circuit 1a becomes capable of operation. Since the supply of the second electric power from the second power supply circuit 1d to the interface circuit 1b is maintained, the data stored in the interface circuit 1b are maintained. That is, resetting of the data in the interface circuit 1b is not necessary.

Therefore, on restart, the operations described in paragraph (2) can be performed without the environment setting described in paragraph (1). In the practical systems, when electric power supplied to a microprocessor is turned on, the microprocessor immediately starts the operations as described in paragraph (2) except that the microprocessor starts execution of a reset sequence in response to a request from a board on which the microprocessor is mounted. That is, when the electric power supplied to the target board 2 is turned on again, the emulation circuit 1a can operate in a similar manner to the microprocessors in the practical systems.

As explained above, in the evaluation system according to the present invention, the emulation circuit 1a is powered by the target board 2, and the interface circuit 1b is powered by the evaluation tool 3. Therefore, even when the target board 2 is powered off, the power supply from the evaluation tool 3 to the interface circuit 1b is maintained, and the data stored in the interface circuit 1b are not erased. Thus, when the electric power supplied to the target board 2 is turned on again, the emulation circuit 1a can immediately start the execution of the user program without resetting of data in the interface circuit 1b. Consequently, it is possible to obtain a result of emulation which is equivalent to the operations of the microprocessors in the practical systems.

(II) First Embodiment

The first embodiment of the present invention is explained below.

Figure 2:
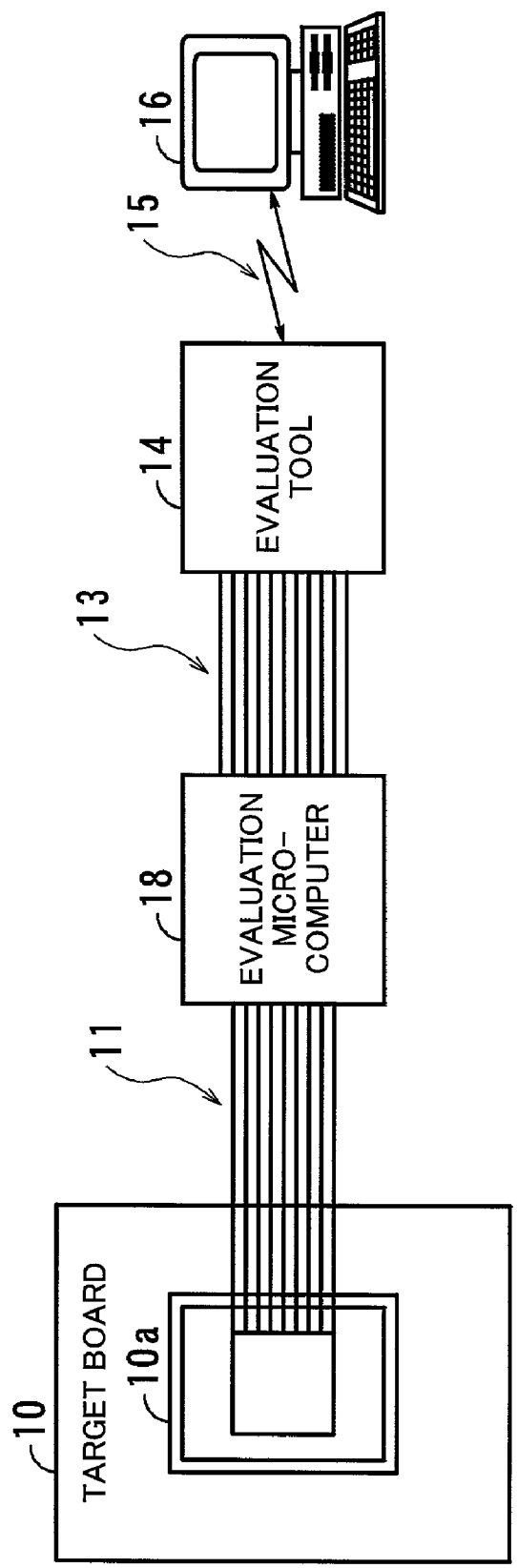
FIG. 2 is a diagram illustrating a common outline of the constructions of the evaluation systems as the first and second embodiments of the present invention.

FIG. 2 is a diagram illustrating a common outline of the constructions of the evaluation systems as the first and second embodiments of the present invention.

Figure 8:
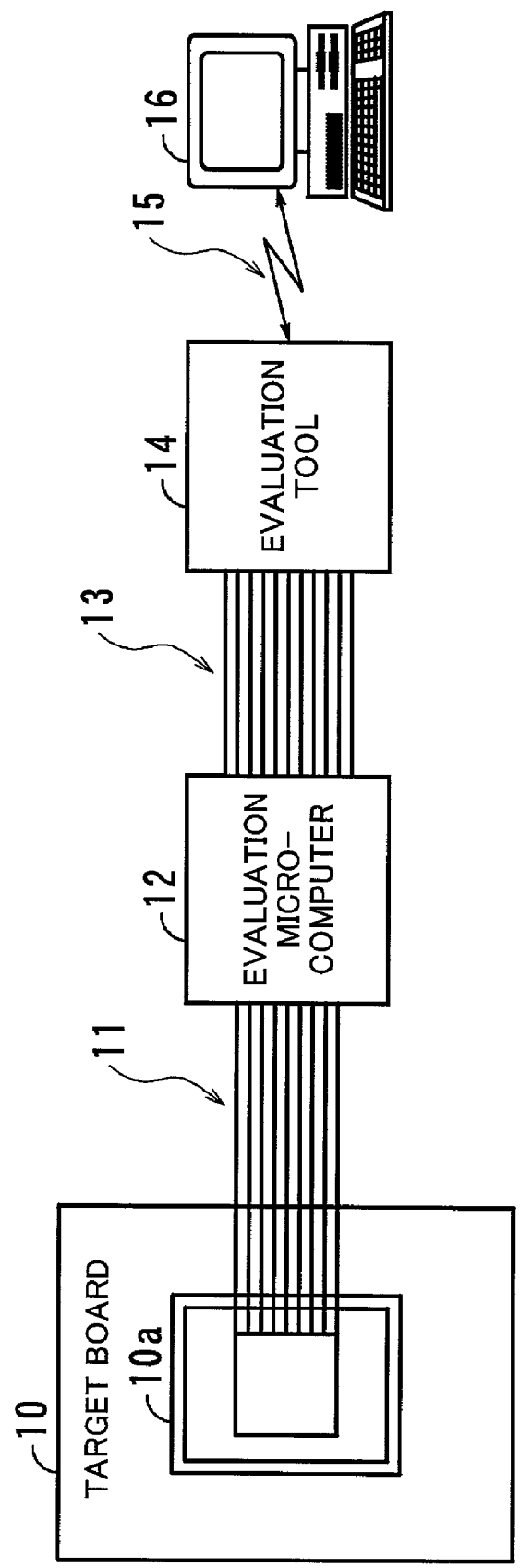
FIG. 8 is a diagram illustrating an example of a construction of a conventional evaluation system for testing the microprocessor.

The evaluation system of FIG. 2 comprises a target board 10, an evaluation microcomputer 18, an evaluation tool 14, and a personal computer 16. That is, the evaluation system of FIG. 2 is different from the evaluation system of FIG. 8 only in that the evaluation microcomputer 12 is replaced with the evaluation microcomputer 18.

The evaluation microcomputer 18 has the same function as the microprocessor which is to be inserted into the socket 10a, and a function of monitoring a microprocessor. The evaluation microcomputer 18 is connected to the socket 10a through the cable 11 so that data can be exchanged between the target board 10 and the evaluation microcomputer 18. In addition, the evaluation microcomputer 18 is connected to the evaluation tool 14 through the cable 13. The evaluation microcomputer 18 receives and processes ROM data (firmware data to be stored in the ROM) and control signals from the evaluation tool 14, and sends to the evaluation tool 14 data obtained by the processing of the ROM data and control signals.

The evaluation tool 14 generates the ROM data based on data supplied from the personal computer 16, and supplies the ROM data to the evaluation microcomputer 18. In addition, the evaluation microcomputer 18 generates the control signals for controlling the evaluation microcomputer 18, and supplies the control signals to the evaluation microcomputer 18. Further, the evaluation tool 14 receives the data supplied from the evaluation microcomputer 18, and supplies the data to the personal computer 16.

The personal computer 16 supplies ROM data and control signals for controlling the evaluation microcomputer 18, to the evaluation tool 14 through the cable 15. In addition, the personal computer 16 acquires and analyzes data collected by the evaluation microcomputer 18.

Figure 3:
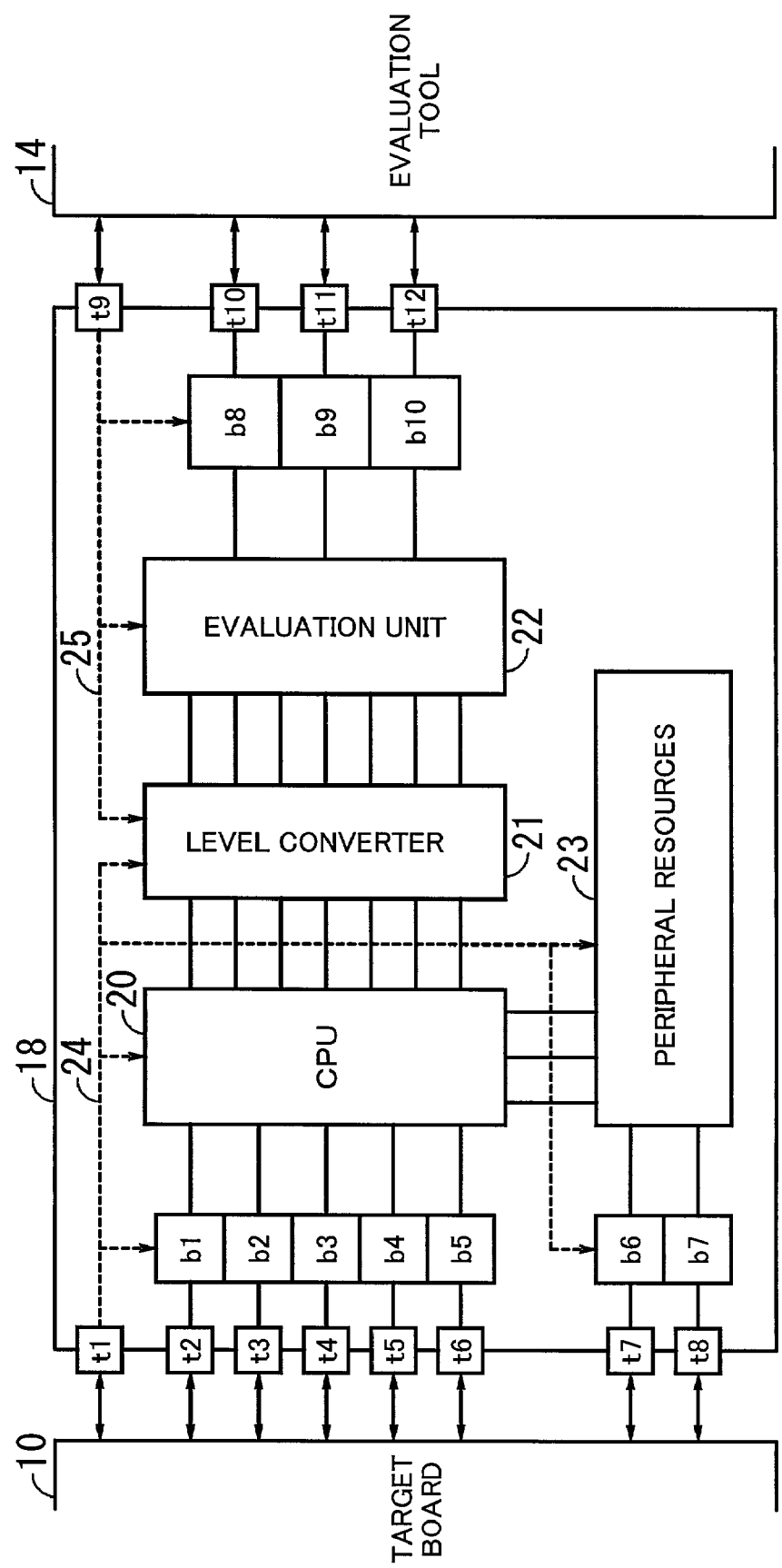
FIG. 3 is a diagram illustrating an example of a detailed construction of the evaluation microcomputer 18 in the first embodiment of the present invention.

FIG. 3 is a diagram illustrating an example of a detailed construction of the evaluation microcomputer 18 in the first embodiment of the present invention. The evaluation microcomputer 18 of FIG. 3 comprises terminals t1 to t12, buffers b1 to b10, a CPU (Central Processing Unit) 20, a level converter 21, an evaluation unit 22, peripheral resources 23, and power supply lines 24 and 25.

The evaluation microcomputer 18 receives first electric power from the target board 10 through the terminal t1, and second electric power from the evaluation tool 14 through the terminal t9. The first electric power is supplied to the buffers b1 to b7, the CPU 20, the level converter 21, and the peripheral resources 23 through the power supply lines 24, and the second electric power is supplied to the buffers b8 to b10, the evaluation unit 22, and the level converter 21.

The terminals t2 to t6 are connected to the target board 10 through the cable 11, so that data output from the target board 10 can be supplied to the buffers b1 to b5, and data output from the buffers b1 to b5 can be supplied to the target board 10 through the cable 11.

The terminals t7 and t8 are also connected to the target board 10 through the cable 11, so that data output from the target board 10 can be supplied to the buffers b6 and b7, and data output from the buffers b6 and b7 can be supplied to the target board 10 through the cable 11.

The terminals t10 to t12 are connected to the evaluation tool 14 through the cable 13, so that data output from the evaluation tool 14 can be supplied to the buffers b10 to b12, and data output from the buffers b10 to b12 can be supplied to the evaluation tool 14.

When data are exchanged between the CPU 20 and the target board 10, the buffers b1 to b5 temporarily store the data so that differences in the data transfer rate are absorbed.

Similarly, when data are exchanged between the peripheral resources 23 and the target board 10, the buffers b6 and b7 temporarily store the data so that differences in the data transfer rate are absorbed.

Further, when data are exchanged between the evaluation unit 22 and the evaluation tool 14, the buffers b10 to b12 temporarily store the data so that differences in the data transfer rate are absorbed.

The CPU 20 is a microprocessor which is to be mounted on the target board 10, and has identical functions to production-run microprocessors. The CPU 20 executes processing in accordance with ROM data supplied from the level converter 21, and supplies data obtained as a result of the processing, to the evaluation unit 22 through the level converter 21. In addition, the CPU 20 controls the target board 10 and the peripheral resources 23 in accordance with the ROM data.

The level converter 21 converts the signal level so that data can be exchanged between the CPU 20 and the evaluation unit 22 without errors.

The evaluation unit 22 has a function of an interface between the CPU 20 and the evaluation tool 14, and includes registers for environment setting, in which the CPU 20 sets data for environment setting by executing a tool program supplied from the evaluation tool 14. In addition, the evaluation unit 22 generates an interruption to the CPU 20 based on the data set in the registers, and makes the CPU 20 execute predetermined processing.

The peripheral resources 23 are peripheral devices to the CPU 20, and include, for example, a RAM (random access memory), interfaces, a timer, and the like.

Figure 4:
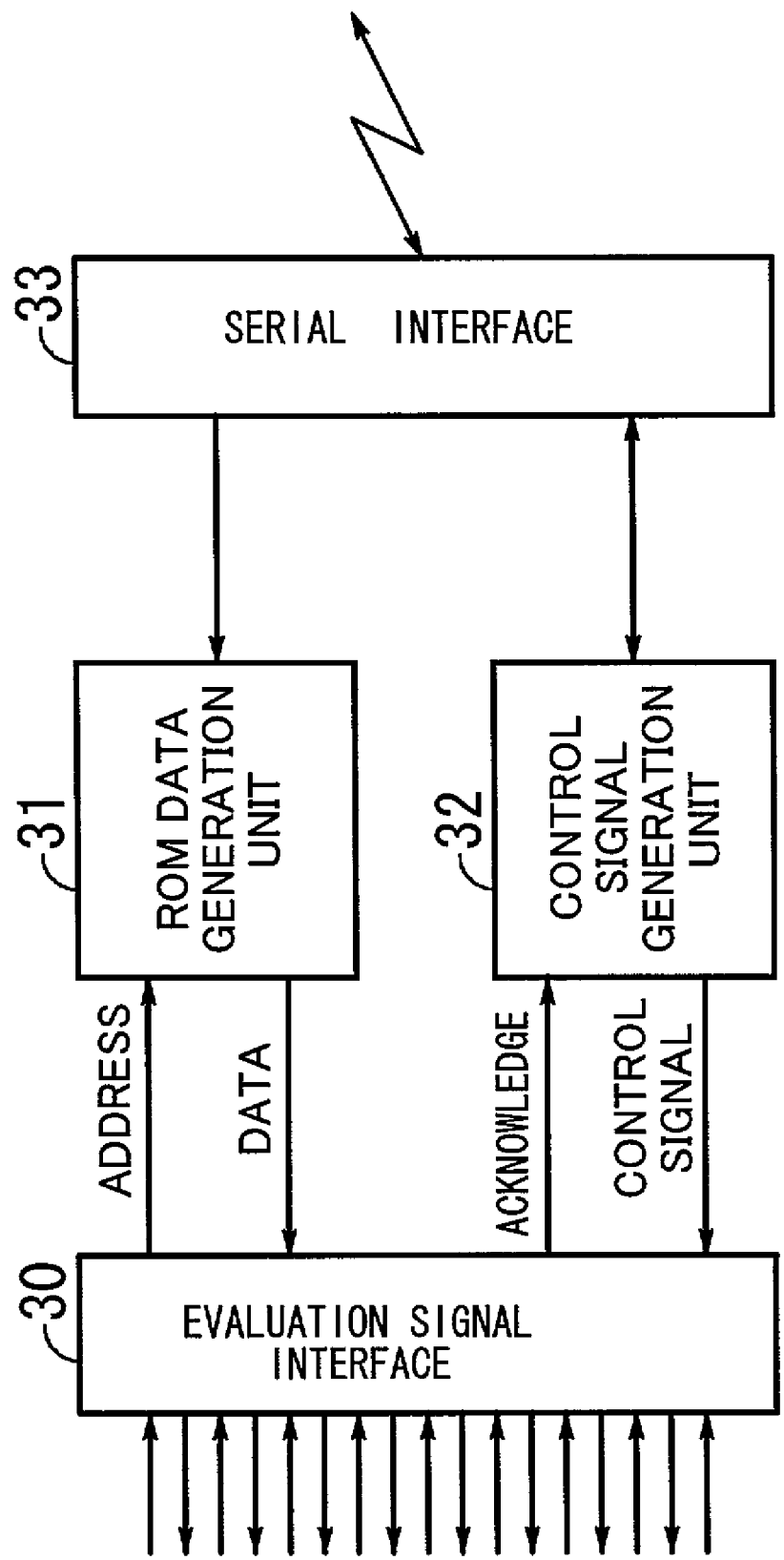
FIG. 4 is a diagram illustrating an example of a detailed construction of the evaluation tool 14 in the evaluation systems of FIG. 2.

FIG. 4 is a diagram illustrating an example of a detailed construction of the evaluation tool 14 in the evaluation systems of FIG. 2. The evaluation tool 14 of FIG. 4 comprises an evaluation signal interface 30, a ROM data generation unit 31, a control signal generation unit 32, and a serial interface 33.

The evaluation signal interface 30 exchanges evaluation signals with the evaluation microcomputer 18.

The ROM data generation unit 31 generates and stores ROM data based on data supplied from the personal computer 16 through the serial interface 33. In addition, the serial interface 33 reads out a portion of the ROM data designated by an address signal supplied through the evaluation signal interface 30, and supplies the read out portion of the ROM data to the evaluation microcomputer 18.

The control signal generation unit 32 generates a control signal based on the data supplied through the serial interface 33, supplies the control signal to the evaluation microcomputer 18 through the evaluation signal interface 30, and receives an acknowledge signal from the evaluation microcomputer 18.

The serial interface 33 includes, for example, USB (Universal Serial Bus) ports and the like, and converts the format of data supplied from the personal computer 16, into an internal format of the evaluation tool 14.

(III) Operation of First Embodiment

The operations of the evaluation system as the first embodiment of the present invention on startup and restart are explained below.

The operations explained below are performed based on instructions supplied from the personal computer 16 to the evaluation tool 14. For example, the instructions are generated by compiling a tool program and a user program by a compiler in the personal computer 16 when the tool program and the user program are written in a compiled language. It is necessary that the tool program and the user program are stored (e.g., in an internal storage device) in the personal computer 16. The tool program and the user program may be produced in the personal computer 16.

(1) Operations after Startup (1.1) Operations on Startup

When the personal computer 16, the evaluation tool 14, and the evaluation microcomputer 18 are powered in this order, the first electric power is supplied through the power supply lines 24 to the CPU 20, the level converter 21, the peripheral resources 23, and the buffers b1 to b7. In addition, the second electric power is supplied through the power supply lines 25 to the buffers b8 to b10, the evaluation unit 22, and the level converter 21. Thus, the evaluation microcomputer 18 becomes capable of operation.

(1.2) First Reset Sequence

When the CPU 20 becomes capable of operation, a first reset sequence is performed. Specifically, first, a signal indicating from which of an internal ROM and an external ROM data is to be read is supplied from the target board 10 to a mode terminal of the CPU 20. In this example, a signal which indicates the internal ROM is input into the mode terminal of the CPU 20.

Subsequently, the personal computer 16 supplies to the evaluation tool 14 data indicating a start address of the tool program (i.e., a program for initial setting of internal registers and the like in the evaluation unit 22). The evaluation tool 14 receives the data through the serial interface 33, and temporarily stores the data in the ROM data generation unit 31. Then, the start address of the tool program is supplied to the evaluation microcomputer 18 in the CPU 20.

(1.3) Execution of Tool Program

The CPU 20 accesses an address of the ROM data generation unit 31 corresponding to the start address of the tool program, and requests readout of the ROM data. At this time, the tool program supplied from the personal computer 16 in the reset sequence is already stored in an area beginning from the address corresponding to the start address of the tool program, in the ROM data generation unit 31. Therefore, the ROM data generation unit 31 acquires the ROM data stored in the area beginning from the address corresponding to the start address of the tool program, and supplies the acquired ROM data to the evaluation microcomputer 18 through the evaluation signal interface 30.

The evaluation microcomputer 18 reads in the ROM data supplied through the terminals t10 to t12, temporarily stores the ROM data in the buffers b8 to b10, and supplies the ROM data to the level converter 21 through the evaluation unit 22.

The level converter 21 receives the ROM data, converts the signal level of the received ROM data into a signal level corresponding to the voltage of the first electric power supplied from the target board 10, and supplies the converted ROM data to the CPU 20.

The CPU 20 receives the ROM data from the level converter 21, and executes instructions described in the ROM data. Since the ROM data describes the tool program, the CPU 20 sets data for environment setting, such as data indicating ROM areas and mask areas, in the internal registers of the evaluation unit 22 in accordance with the tool program. Thus, the CPU 20 can refer to the data set in the registers in the internal registers of the evaluation unit 22, and read out data from appropriate areas of the ROM data generation unit 31. That is, the CPU 20 can obtain mapping information on the address space.

(1.4) Second Reset Sequence

When the data for environment setting are set in the evaluation unit 22 as above, the personal computer 16 sends to the evaluation tool 14 a control signal for resetting the evaluation microcomputer 18. The control signal generation unit 32 in the evaluation tool 14 acquires the control signal through the serial interface 33, and supplies the acquired control signal to the evaluation microcomputer 18 through the evaluation signal interface 30.

The evaluation microcomputer 18 receives the control signal, and supplies the control signal to the CPU 20 through the evaluation unit 22 and the level converter 21. When the CPU 20 receives the control signal, the CPU 20 executes a reset operation, which starts a second reset sequence.

When the second reset sequence is started, first, a signal indicating from which of the internal ROM and the external ROM data is to be read is supplied from the target board 10 to the mode terminal of the CPU 20. In this example, a signal which indicates the internal ROM is input into the mode terminal of the CPU 20.

Subsequently, the personal computer 16 supplies to the evaluation tool 14 data indicating a start address of the user program (e.g., a program produced by the user). The evaluation tool 14 receives the data through the serial interface 33, and temporarily stores the data in the ROM data generation unit 31. Then, the start address of the user program is supplied to the evaluation microcomputer 18 in the CPU 20.

(1.5) Execution of User Program

The CPU 20 accesses an address of the ROM data generation unit 31 corresponding to the start address of the user program, and requests readout of the ROM data. At this time, the user program supplied from the personal computer 16 is already stored in an area beginning from the address corresponding to the start address of the user program, in the ROM data generation unit 31. Therefore, the ROM data generation unit 31 acquires the ROM data stored in the area beginning from the address corresponding to the start address of the user program, and supplies the acquired ROM data to the evaluation microcomputer 18 through the evaluation signal interface 30.

The evaluation microcomputer 18 reads in the ROM data supplied through the terminals t10 to t12, temporarily stores the ROM data in the buffers b8 to b10, and supplies the ROM data to the level converter 21 through the evaluation unit 22.

The level converter 21 receives the ROM data, converts the signal level of the received ROM data into the signal level corresponding to the voltage of the first electric power supplied from the target board 10, and supplies the converted ROM data to the CPU 20.

The CPU 20 receives the ROM data from the level converter 21, and executes instructions described in the ROM data. Since the ROM data describes the user program, the CPU 20 executes various types of processing and controls the respective portions of the target board 10, in accordance with the user program.

At this time, the evaluation tool 14 can set an appropriate break point in the user program so that the execution of the user program stops at an arbitrary location in the program, and the user can refer to the contents of the internal registers. Therefore, the user can debug the user program by arbitrarily setting the stop location in the program and monitoring the values held in the internal registers.

(2) Operations on Restart (2.1) Power Off

When the electric power supplied to the target board 10 is stopped during execution of the user program as described in the above paragraph (1.5), the supply of the first electric power from the target board 10 to the CPU 20, the buffers b1 to b7, the level converter 21, and the peripheral resources 23 is stopped. Therefore, the operations of the CPU 20, the peripheral resources 23, and the like stop. At this time, the supply of the second electric power from the evaluation tool 14 to the level converter 21 is maintained. Thus, it is possible to prevent propagation of noise, which can cause a malfunction, to the evaluation tool 14.

(2.2) Operations on Restart

When the target board 10 is powered again, the first electric power is supplied through the power supply lines 24 to the CPU 20, the level converter 21, the peripheral resources 23, and the buffers b1 to b7. Thus, the evaluation microcomputer 18 becomes capable of operation.

(2.3) Reset Sequence

When the CPU 20 becomes capable of operation, the aforementioned second reset sequence is performed. Specifically, first, a signal indicating from which of the internal ROM and the external ROM data is to be read is supplied from the target board 10 to the mode terminal of the CPU 20. In this example, a signal which indicates the internal ROM is input into the mode terminal of the CPU 20.

Subsequently, the personal computer 16 supplies to the evaluation tool 14 data indicating the start address of the user program. The evaluation tool 14 receives the data through the serial interface 33, and temporarily stores the data in the ROM data generation unit 31. Then, the start address of the user program is supplied to the evaluation microcomputer 18 in the CPU 20.

(2.4) Execution of User Program

The CPU 20 accesses the address of the ROM data generation unit 31 corresponding to the start address of the user program, and requests readout of the ROM data. At this time, the user program supplied from the personal computer 16 is already stored in an area beginning from the address corresponding to the start address of the user program, in the ROM data generation unit 31. Therefore, the ROM data generation unit 31 acquires the ROM data stored in the area beginning from the address corresponding to the start address of the user program, and supplies the acquired ROM data to the evaluation microcomputer 18 through the evaluation signal interface 30.

The evaluation microcomputer 18 reads in the ROM data supplied through the terminals t10 to t12, temporarily stores the ROM data in the buffers b8 to b10, and supplies the ROM data to the level converter 21 through the evaluation unit 22.

The level converter 21 receives the ROM data, converts the signal level of the received ROM data into the signal level corresponding to the voltage of the first electric power supplied from the target board 10, and supplies the converted ROM data to the CPU 20.

The CPU 20 receives the ROM data from the level converter 21, and executes instructions described in the ROM data.

In the evaluation system as the first embodiment of the present invention, even when the supply of the electric power to the target board 10 is stopped, the supply of the second electric power from the evaluation tool 14 to the evaluation unit 22 is maintained, and therefore the data set in the internal registers of the evaluation unit 22 are also maintained. Thus, on restart after the stop of the electric power supplied to the target board 10, the user program can be executed without execution of the tool program. Since, on restart after stop of the electric power supplied to production-run chips, the user program is started without execution of the tool program, the evaluation system as the first embodiment of the present invention can check the operation of the target board under a similar condition to the production-run chips.

In addition, since the level converter 21 is arranged between the CPU 20 and the evaluation unit 22, it is possible to prevent propagation of noise to the evaluation tool 14 and occurrence of a malfunction. Further, although various power-supply voltages are used in the target board 10, the evaluation microcomputer 18 can normally operate regardless of what voltage is used in the target board 10.

(IV) Operation Flow

Figure 5:
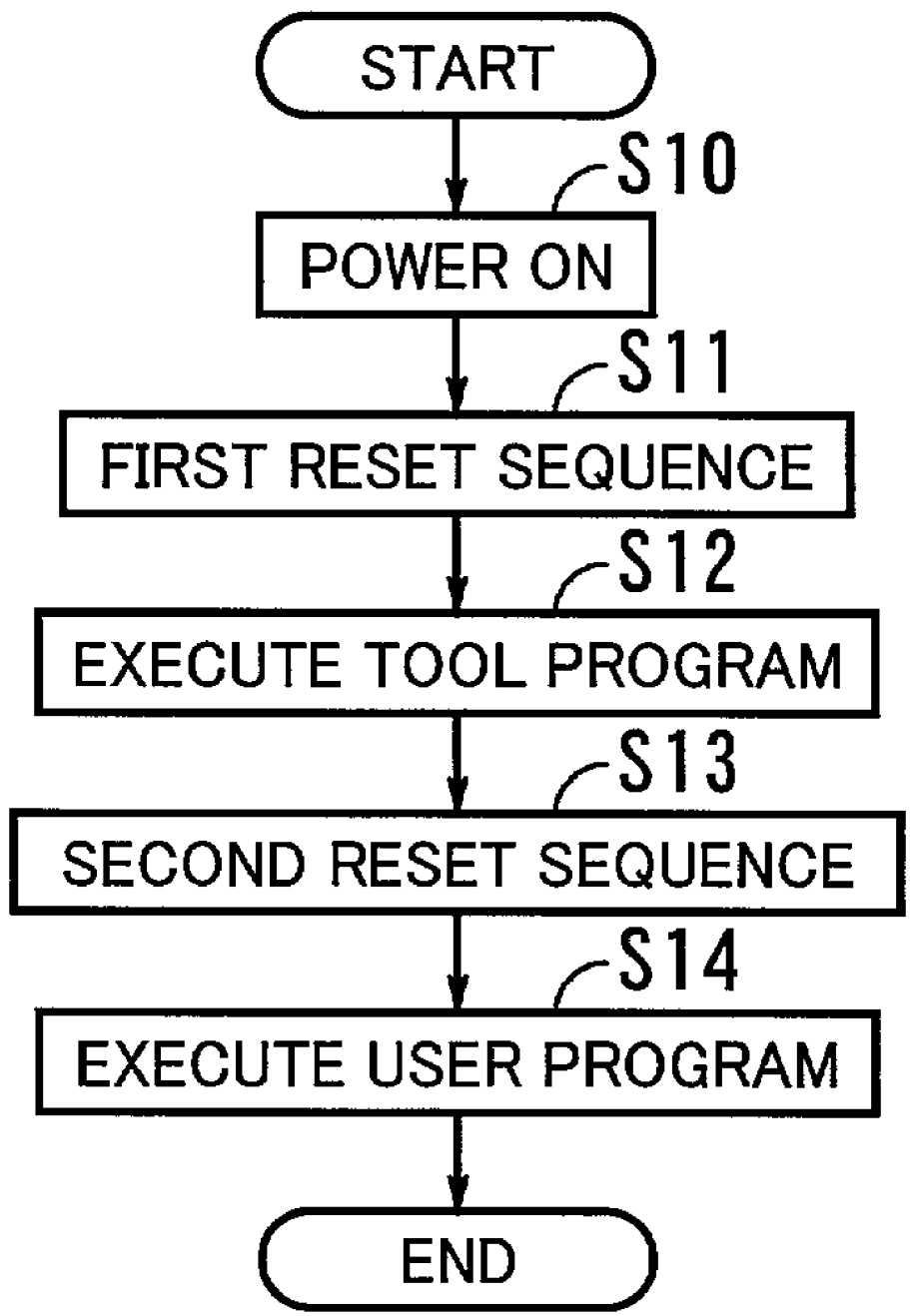
FIG. 5 is a flow diagram indicating a sequence of operations performed on startup of the CPU 20 in the evaluation system as the first embodiment of the present invention.

FIG. 5 is a flow diagram indicating a sequence of operations performed on startup in the evaluation system as the first embodiment of the present invention.

In step S10 (corresponding to paragraph (1.1)), the electric power is supplied by the user to the personal computer 16, the evaluation tool 14, and the target board 10.

In step S11 (corresponding to the paragraph (1.2)), a signal indicating from which of the internal ROM and the external ROM data is to be read is supplied from the target board 10 to the mode terminal of the CPU 20, and the first rest sequence is performed, where the start address of the tool program is supplied.

In step S12 (corresponding to the paragraph (1.3)), a tool program is executed, so that data for environment setting, such as data indicating ROM areas and mask areas, are set in the internal registers of the evaluation unit 22 in accordance with the tool program.

In step S13 (corresponding to the paragraph (1.4)), a signal indicating from which of the internal ROM and the external ROM data is to be read is supplied from the target board 10 to the mode terminal of the CPU 20, and the second rest sequence is performed, where the start address of the user program is supplied.

In step S14 (corresponding to the paragraph (1.5)), the user program, which is to be debugged, is executed.

Thus, the operations described in the paragraphs (1.1) to (1.5) can be performed in accordance with the sequence of FIG. 5.

Figure 6:
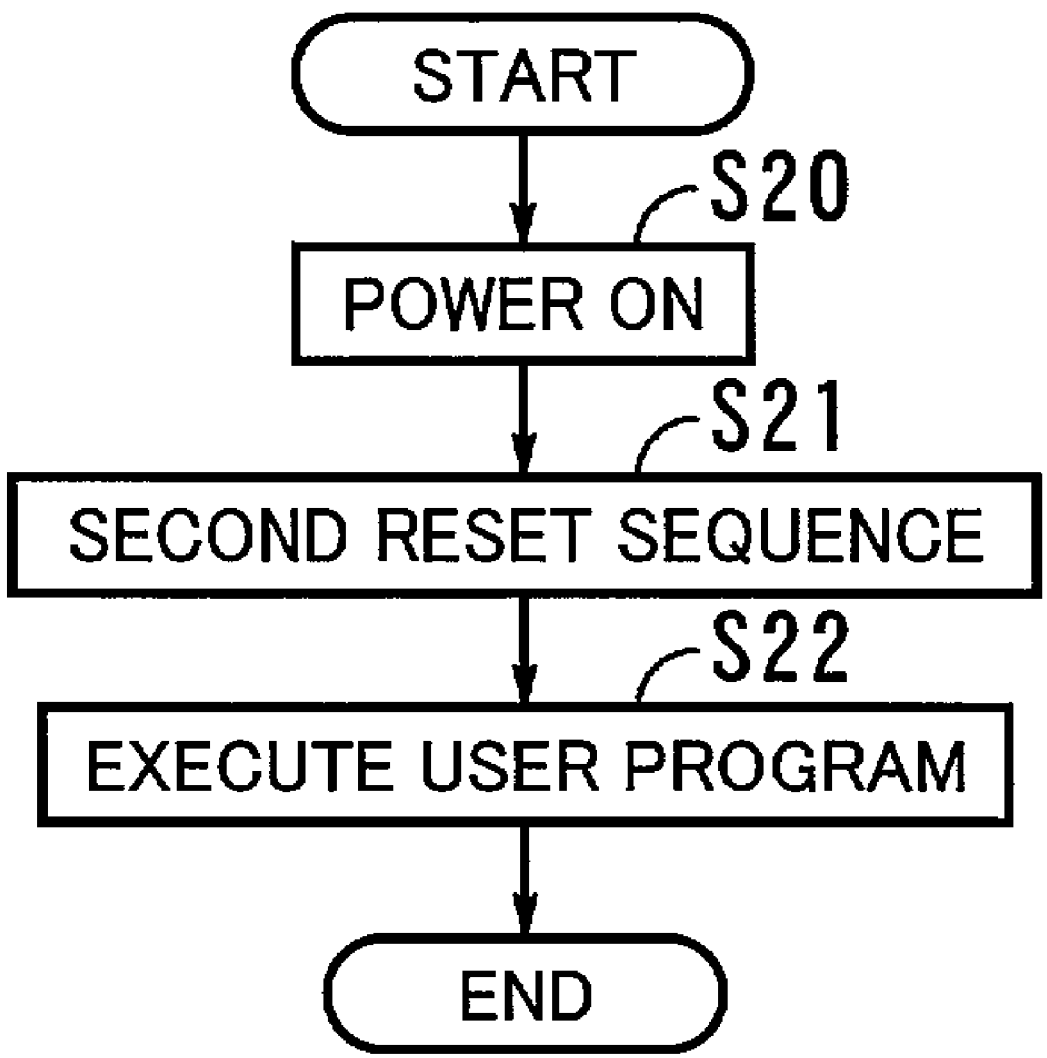
FIG. 6 is a flow diagram indicating a sequence of operations performed on restart of the CPU 20 in the evaluation system as the first embodiment of the present invention.

FIG. 6 is a flow diagram indicating a sequence of operations performed on restart of the CPU 20 in the evaluation system as the first embodiment of the present invention.

In step S20 (corresponding to the paragraph (2.2)), the electric power supplied to the target board 10 is turned on by the user.

In step S21 (corresponding to the paragraph (2.3)), a signal indicating from which of the internal ROM and the external ROM data is to be read is supplied from the target board 10 to the mode terminal of the CPU 20, and the second rest sequence is performed, where the start address of the user program is supplied.

In step S22 (corresponding to the paragraph (2.4)), the user program, which is to be debugged, is executed.

Thus, the operations described in the paragraphs (2.2) to (2.4) can be performed in accordance with the sequence of FIG. 6.

The sequence of FIG. 6 corresponds to the sequence of operations performed when the production-run chips are restarted, while the sequence of FIG. 5 is performed on restart of the CPU 20 in the conventional evaluation system. That is, the user program can be debugged in an environment similar to the practical system.

(V) Second Embodiment

Figure 7:
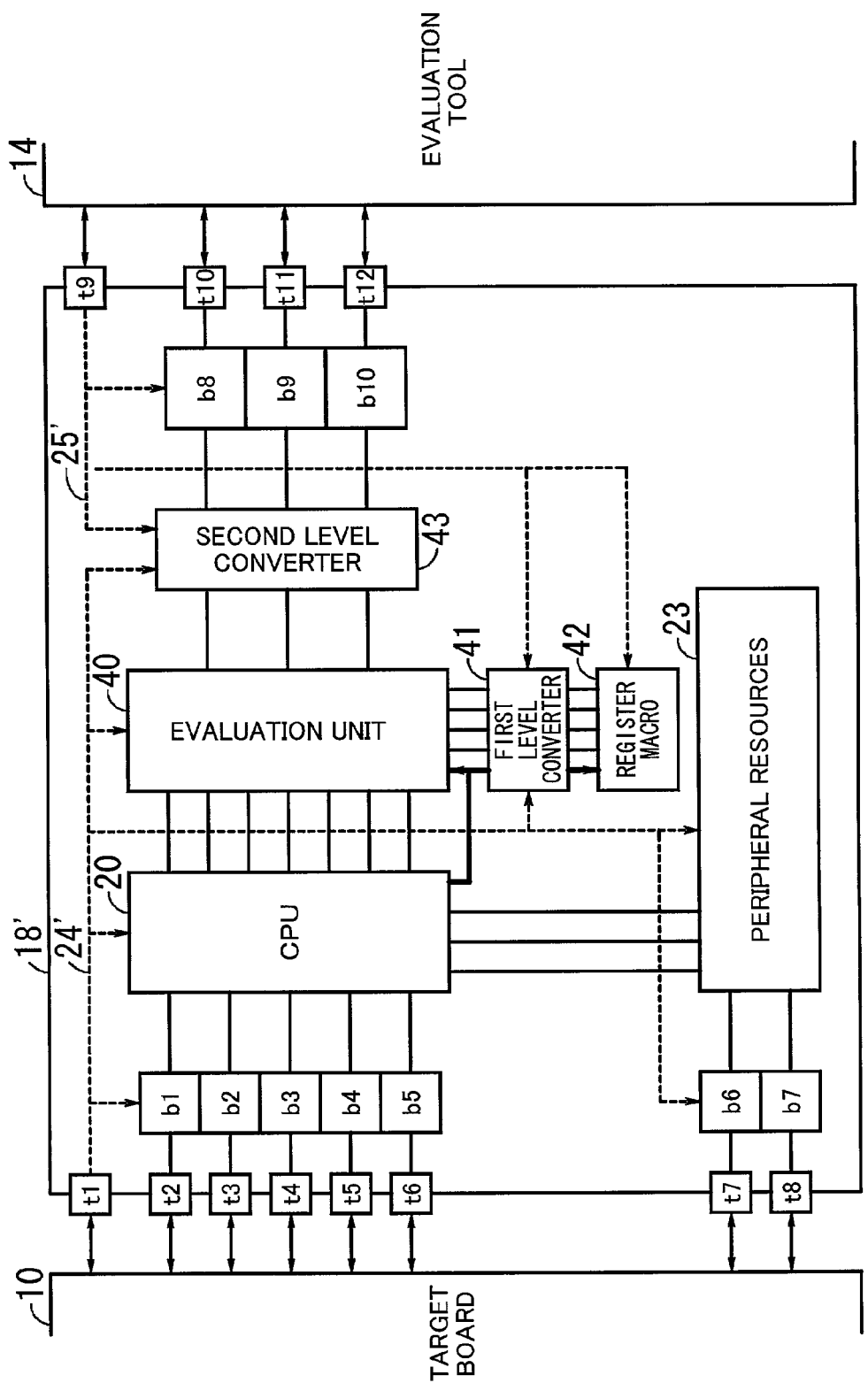
FIG. 7 is a diagram illustrating an example of a detailed construction of the evaluation microcomputer 18' in the second embodiment of the present invention.

FIG. 7 is a diagram illustrating an example of a detailed construction of the evaluation microcomputer 18' in the second embodiment of the present invention. In FIG. 7, elements having the same functions as the elements in the evaluation system of FIG. 3 bear the same reference numerals as FIG. 3, respectively.

The evaluation microcomputer 18' of FIG. 7 is different from the evaluation microcomputer 18 of FIG. 3 in that the evaluation unit 22 is replaced with an evaluation unit 40, the level converter 21 is removed, a register macro 42 is provided, a first level converter 41 is provided between the evaluation unit 40 and the register macro 42, and a second level converter 43 is provided between the evaluation unit 40 and the buffers b8 to b10. The other portions of the evaluation system as the second embodiment of the present invention are identical to the corresponding portions of the evaluation system as the first embodiment of the present invention.

The evaluation unit 40 is equivalent to the evaluation unit 22 except that the internal registers are not included in the evaluation unit 40. The internal registers are realized by the register macro 42, which is arranged separately from the evaluation unit 40, and powered by the evaluation tool 14.

The first level converter 41 converts the signals output from the evaluation unit 40, into signals having a signal level corresponding to the voltage of the register macro 42, and also converts signals output from the register macro 40, into signals having a signal level corresponding to the voltage of the evaluation unit 42.

The second level converter 43 converts between the signal levels of the evaluation unit 40 and the buffers b8 to b10.

The first electric power from the target board 10 is supplied through the power supply lines 24' to the buffers b1 to b7, the CPU 20, the peripheral resources 23, the evaluation unit 40, and the first and second level converters 41 and 43, and the second electric power from the evaluation tool 14 is supplied through the power supply lines 25' to the buffers b8 to b10, the first and second level converters 41 and 43, and the register macro 42.

The operations of the evaluation system as the second embodiment of the present invention are identical to the operations of the first embodiment except for the operations described in the paragraphs (1.3), (1.5), and (2.4).

That is, in the second embodiment, data for environment setting are stored in and read from the register macro 42 through the first level converter 41 in FIG. 7, while in the first embodiment, the data for environment setting are stored in and read from the internal registers in the evaluation unit 22 in FIG. 3.

The number of wirings connecting the CPU 20 and the evaluation unit 40 is greater than the sum of the number of wirings connecting the evaluation unit 40 and the register macro 42 and the number of wirings connecting the evaluation unit 40 and the buffers b8 to b10. Since a level converter element is required to be arranged for each wiring, it is possible to reduce the number of level converter elements and the size of the circuitry by removing the level converter 21 (illustrated in FIG. 3) and arranging the first level converter 41 between the evaluation unit 40 and the register macro 42 and the second level converter 43 between the evaluation unit 40 and the buffers b8 to b10.

(VI) Variations and Other Matters (i) The evaluation microcomputer 18 or 18' can be formed as a semiconductor device by using, for example, CMOS processes.

(ii) The evaluation microcomputer 18 or 18' and the evaluation tool 14 may be integrated into a single unit.

(iii) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(iv) All of the contents of the Japanese patent application, No.2001-315023 are incorporated into this specification by reference.

What is claimed is:

1. An evaluation system for evaluating a target board which is produced for use with a microprocessor, and supplies first electric power to a first power supply circuit, comprising:

an evaluation tool which supplies ROM data to an evaluation microcomputer, and second electric power to a second power supply circuit, wherein said evaluation microcomputer is connected to said target board and said evaluation tool, and comprises:
an emulation circuit which emulates functions of said microprocessor, and supplies an emulation result to said evaluation tool through an interface circuit,
said interface circuit which interfaces said emulation circuit with said evaluation tool, and stores environment setting data relating to said microprocessor,
said first power supply circuit which supplies said first electric power to said emulation circuit and does not supply power to said interface circuit, and
said second power supply circuit which supplies said second electric power to said interface circuit; and
wherein said evaluation tool and said interface circuit retain said ROM data and said environment setting data when said emulation circuit and said target board are powered again and restarted.

2. The evaluation system according to claim 1, wherein said evaluation microcomputer further comprises a peripheral circuit to said microprocessor, and said first power supply circuit also supplies said first electric power to said peripheral circuit.

3. An evaluation microcomputer for emulating functions of a microprocessor which is to be mounted to a target board under evaluation, comprising:
an emulation circuit which emulates the functions of said microprocessor, and outputs an emulation result through an interface circuit which interfaces said emulation circuit with an evaluation tool, and stores environment setting data relating to said microprocessor;
a first power supply circuit which receives first electric power from said target board, and supplies the first electric power to said emulation circuit and does not supply power to said interface circuit; and
a second power supply circuit which receives second electric power from said evaluation tool, and supplies the second electric power to said interface circuit,
wherein said evaluation tool receives said emulation result from said emulation circuit via said interface circuit, and supplies ROM data to the evaluation microcomputer, and wherein said evaluation tool and said interface circuit retain said ROM data and said environment setting data when said emulation circuit and said target board are powered again and restarted.

4. The evaluation microcomputer according to claim 3, further comprising a peripheral circuit to said microprocessor, wherein said first power supply circuit also supplies said first electric power to said peripheral circuit.

5. An evaluation system for evaluating a target board which is produced for use with a microprocessor, and supplies first electric power to a first power supply circuit, comprising:
an evaluation tool which supplies ROM data to an evaluation microcomputer, and second electric power to a second power supply circuit,
wherein said evaluation microcomputer is connected with said target board and said evaluation tool, and comprises:
an emulation circuit which emulates functions of said microprocessor, and supplies an emulation result to said evaluation tool through an interface circuit,
said interface circuit which interfaces said emulation circuit with said evaluation tool,
a data storing circuit which stores environment setting data relating to said microprocessor,
said first power supply circuit which supplies said first electric power to said emulation circuit and does not supply power to said interface circuit, and
a second power supply circuit which supplies said second electric power to said data storing circuit; and
wherein said evaluation tool and said interface circuit retain said ROM data and said environment setting data when said emulation circuit and said target board are powered again and restarted.

6. The evaluation system according to claim 5, wherein said evaluation microcomputer further comprises a peripheral circuit to said microprocessor, and said first power supply circuit also supplies said first electric power to said peripheral circuit.

7. An evaluation microcomputer for emulating functions of a microprocessor which is to be mounted to a target board under evaluation, comprising:
an emulation circuit which emulates the functions of said microprocessor, and outputs an emulation result through an interface circuit which interfaces said emulation circuit with an evaluation tool;
a data storing circuit which stores environment setting data relating to said microprocessor;
a first power supply circuit which receives first electric power from said target board, and supplies said first electric power to said emulation circuit and does not supply power to said interface circuit; and
a second power supply circuit which receives second electric power from said evaluation tool, and supplies said second electric power to said data storing circuit,
wherein said evaluation tool receives said emulation result from said emulation circuit via said interface circuit and supplies ROM data to the evaluation microcomputer, and wherein said evaluation tool and said interface circuit retain said ROM data and said environment setting data when said emulation circuit and said target board are powered again and restarted.

8. The evaluation microcomputer according to claim 7, further comprising a peripheral circuit to said microprocessor, wherein said first power supply circuit also supplies said first electric power to said peripheral circuit.

9. An evaluation apparatus for evaluating a target board which is produced for use with a microprocessor, and supplies first electric power to a first power supply circuit, comprising;
an evaluation tool which supplies ROM data to an evaluation microcomputer, and second electric power to a second power supply circuit
wherein said evaluation microcomputer is connected with said target board and said evaluation tool, and comprises:
an emulation circuit which emulates functions of said microprocessor, and supplies an emulation result to said evaluation tool through an interface circuit,
said interface circuit which interfaces said emulation circuit with said evaluation tool, and stores environment setting data relating to said microprocessor,
said first power supply circuit which supplies said first electric power to said emulation circuit and does not supply power to said interface circuit, and
said second power supply circuit which supplies said second electric power to said interface circuit; and
wherein said evaluation tool and said interface circuit retain said ROM data and said environment setting data when said emulation circuit and said target board are powered again and restarted.

10. The evaluation system according to claim 9, wherein said evaluation microcomputer further comprises a peripheral circuit to said microprocessor, and said first power supply circuit also supplies said first electric power to said peripheral circuit.

11. An evaluation apparatus for evaluating a target board which is produced for use with a microprocessor, and supplies first electric power to a first power supply circuit, comprising:

an evaluation tool which supplies ROM data to an evaluation microcomputer, and second electric power to a second power supply circuit, wherein said evaluation microcomputer is connected with said target board and said evaluation tool, and comprises an emulation circuit which emulates functions of said microprocessor, and supplies an emulation result to said evaluation tool through an interface circuit, said interface circuit which interfaces said emulation circuit with said evaluation tool, a data storing circuit which stores environment setting data relating to said microprocessor, said first power supply circuit which supplies said first electric power to said emulation circuit and does not supply power to said interface circuit, and said second power supply circuit which supplies said second electric power to said data storing circuit; and wherein said evaluation tool and said interface circuit retain said ROM data and said environment setting data when said emulation circuit and said target board are powered again and restarted.

12. The evaluation apparatus according to claim 11, wherein said evaluation microcomputer further comprises a peripheral circuit to said microprocessor, and said first power supply circuit also supplies said first electric power to said peripheral circuit.

* * * * *